US012633599B2

(12) United States Patent
Hu et al.

(10) Patent No.: US 12,633,599 B2
(45) Date of Patent: May 19, 2026

(54) BATTERY

(71) Applicant: Ningde Amperex Technology Limited, Ningde (CN)

(72) Inventors: Dongge Hu, Ningde (CN); Weifeng Han, Ningde (CN); Bin Liu, Ningde (CN); Tao Wang, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

(21) Appl. No.: 18/593,227

(22) Filed: Mar. 1, 2024

(65) Prior Publication Data

US 2024/0213586 A1     Jun. 27, 2024

Related U.S. Application Data

(63) Continuation of application No. 16/960,840, filed as application No. PCT/CN2020/079727 on Mar. 17, 2020, now abandoned.

(30) Foreign Application Priority Data

Apr. 25, 2019    (CN) .......................... 201920574787.0

(51) Int. Cl.
*H01M 50/107*        (2021.01)
*H01M 10/0525*        (2010.01)
(Continued)

(52) U.S. Cl.
CPC ..... *H01M 50/107* (2021.01); *H01M 10/0525* (2013.01); *H01M 10/0587* (2013.01);
(Continued)

(58) Field of Classification Search
CPC ............. H01M 50/107; H01M 50/119; H01M 50/317; H01M 50/533; H01M 50/545;
(Continued)

(56) References Cited

U.S. PATENT DOCUMENTS

| 5,958,088 A | 9/1999 | Vu et al. |
| 9,300,006 B2 | 3/2016 | Kim et al. |

(Continued)

FOREIGN PATENT DOCUMENTS

| CA | 2190229 C | 2/2005 |
| CN | 102593406 A | 7/2012 |

(Continued)

OTHER PUBLICATIONS

Japanese Office Action mailed Sep. 2, 2021 in counterpart Japanese Application 2020518534, 6 pages in Japanese.

(Continued)

*Primary Examiner* — Adam J Francis

(74) *Attorney, Agent, or Firm* — Maier & Maier, PLLC

(57) ABSTRACT

A battery including a curved metal shell, a curved metal plate, and a curved electrode assembly. The curved metal shell has a curved surface and a plurality of side walls extending from the curved surface. The curved electrode assembly is disposed between the curved metal shell and the curved metal plate. The plurality of side walls are bound with the curved metal plate to seal the curved electrode assembly between the curved metal shell and the curved metal plate. By disposing a direction of an opening of the curved metal shell, the difficulty in the manufacturing process of the battery is greatly reduced, curved electrode assemblies in different structural forms are placed into the curved metal shell more conveniently and smoothly, and the energy density of the battery is also increased.

18 Claims, 7 Drawing Sheets

(51) Int. Cl.

| | |
|---|---|
| *H01M 10/0587* | (2010.01) |
| *H01M 50/103* | (2021.01) |
| *H01M 50/119* | (2021.01) |
| *H01M 50/317* | (2021.01) |
| *H01M 50/533* | (2021.01) |
| *H01M 50/545* | (2021.01) |
| *H01M 50/59* | (2021.01) |

(52) U.S. Cl.
CPC ....... *H01M 50/103* (2021.01); *H01M 50/119* (2021.01); *H01M 50/317* (2021.01); *H01M 50/533* (2021.01); *H01M 50/545* (2021.01); *H01M 50/59* (2021.01); *H01M 2200/20* (2013.01)

(58) Field of Classification Search
CPC .. H01M 50/59; H01M 50/105; H01M 50/169; H01M 50/188; H01M 50/536; H01M 10/0525; H01M 10/0587; H01M 2200/20
See application file for complete search history.

(56) References Cited

U.S. PATENT DOCUMENTS

| | | | | |
|---|---|---|---|---|
| 9,590,219 | B2 * | 3/2017 | Park | H01M 10/0431 |
| 10,658,632 | B1 * | 5/2020 | Zeng | H01M 50/159 |
| 2003/0017372 | A1 * | 1/2003 | Probst | H01M 50/247 |
| | | | | 429/7 |
| 2003/0031923 | A1 | 2/2003 | Aoshima et al. | |
| 2003/0108787 | A1 * | 6/2003 | Endo | H01M 50/119 |
| | | | | 429/300 |
| 2010/0209750 | A1 | 8/2010 | Nagamatsu et al. | |
| 2011/0244318 | A1 * | 10/2011 | Cho | H01M 50/105 |
| | | | | 429/186 |
| 2012/0183825 | A1 | 7/2012 | Lee et al. | |
| 2014/0011070 | A1 * | 1/2014 | Kim | H01M 50/124 |
| | | | | 29/623.2 |

| | | | | |
|---|---|---|---|---|
| 2015/0118533 | A1 * | 4/2015 | Yi | H01M 50/136 |
| | | | | 29/623.2 |
| 2015/0140371 | A1 * | 5/2015 | Slocum | H01M 50/122 |
| | | | | 429/186 |
| 2015/0140449 | A1 * | 5/2015 | Ishikawa | H01M 10/052 |
| | | | | 429/336 |
| 2015/0228933 | A1 * | 8/2015 | Seong | H01M 50/528 |
| | | | | 429/163 |
| 2015/0303413 | A1 * | 10/2015 | Yun | H01M 50/121 |
| | | | | 429/185 |
| 2016/0133987 | A1 * | 5/2016 | Choi | H01M 50/103 |
| | | | | 429/246 |
| 2017/0018747 | A1 | 1/2017 | Yamada et al. | |
| 2018/0183059 | A1 | 6/2018 | Park et al. | |
| 2019/0288324 | A1 * | 9/2019 | Jiang | H01M 10/0431 |
| 2020/0395582 | A1 | 12/2020 | Ogawa | |

FOREIGN PATENT DOCUMENTS

| | | | |
|---|---|---|---|
| CN | 104835925 | A | 8/2015 |
| CN | 105047980 | A | 11/2015 |
| CN | 102593406 | B | 12/2016 |
| CN | 209822691 | U | 12/2019 |
| JP | 2001167743 | A | 6/2001 |
| JP | 2002506276 | A | 2/2002 |
| JP | 4377570 | B2 | 12/2009 |
| JP | 2012151110 | A | 8/2012 |
| JP | 3187576 | U | 12/2013 |
| KR | 1020150036911 | A | 4/2015 |
| KR | 1020150049261 | A | 5/2015 |
| WO | 0182393 | A2 | 11/2001 |
| WO | 2015057643 | A1 | 4/2015 |
| WO | 2017171459 | A1 | 10/2017 |

OTHER PUBLICATIONS

Extneded European Search report issued on Dec. 20, 2023 in counterpart European Patent Application No. 20737081.8, 9 pages.

* cited by examiner

102a

106

109

105

101

108

110

121

102c

122

110

106

46d

40

402d

46b

402a

402b

BATTERY

CROSS REFERENCE TO THE RELATED APPLICATIONS

The present application is a continuation application of U.S. patent application Ser. No. 16/960,840, filed on Jul. 8, 2020, which is a National Stage application of PCT International Application No. PCT/CN2020/079727 filed on Mar. 17, 2020, which claims the benefit of priority from the Chinese Patent Application No. 201920574787.0, filed on Apr. 25, 2019, the disclosure of which is hereby incorporated by reference in its entirety.

BACKGROUND

1. Technical Field

Embodiments of the present application relate to the technical field of electrochemical devices, and more particularly to a battery.

2. Description of the Related Art

The following description and examples are not to be considered as the prior art by virtue of their inclusion in this section.

Rectangular lithium ion batteries are currently the most commonly used secondary lithium ion batteries. They are commonly used in mobile electronic equipment, such as mobile phones and tablet computers. But in recent years, the demand of wearable equipment is increasing more and more. This requires curved batteries with a certain curvature to meet the requirements of ergonomic features, further increase the space utilization ratio of the equipment, and increase the energy of the battery.

At present, existing curved batteries have problems such as high difficulty in welding the electrode assembly, easy contact with the electrode assembly during assembly, and difficulty in putting the special-shaped electrode assembly into a curved shell. Therefore, in order to solve the above problems, it is necessary to improve the existing curved batteries.

SUMMARY

An object of the present application is to provide a battery, which improves the structure of the curved batteries in the prior art and effectively solves many problems existing in the curved batteries in the prior art.

Some embodiments of the present application provide a battery, including: a curved metal shell, a curved metal plate, and a curved electrode assembly. The curved metal shell has a curved surface and a plurality of side walls extending from the curved surface, and the curved electrode assembly is disposed between the curved metal shell and the curved metal plate. The plurality of side walls are bound with the curved metal plate to seal the curved electrode assembly between the curved metal shell and the curved metal plate.

By disposing the curved metal shell, the present application can adapt to an internal space of electronic equipment and improve the energy density of the battery. The curved metal shell has the curved surface and the plurality of side walls extending from the curved surface, and the plurality of side walls are bound with the curved metal plate to seal the curved electrode assembly between the curved metal shell and the curved metal plate. Therefore, the manufacturing process difficulty of the battery is greatly reduced, curved electrode assemblies in different structural forms can be placed into the curved metal shell more conveniently and smoothly, and the energy density of the battery is also increased.

According to some embodiments of the present application, the plurality of side walls include a first flange, the curved metal plate includes a second flange, and the plurality of side walls are bound with the second flange of the curved metal plate through the first flange.

According to some embodiments of the present application, the plurality of side walls include a first side, a second side adjacent to the first side, a third side opposite to the first side, and a fourth side opposite to the second side.

According to some embodiments of the present application, the first side and the third side are horizontal sides, and the second side and the fourth side are curved sides.

According to some embodiments of the present application, the first side, the second side, the third side, and the fourth side are all horizontal sides.

According to some embodiments of the present application, the curved electrode assembly includes a groove or is formed with steps.

According to some embodiments of the present application, the curved electrode assembly and the curved metal shell have a same curvature radius, and the curvature radius is greater than 8 mm.

According to some embodiments of the present application, the curved electrode assembly is a wound structure, the curved electrode assembly includes a cathode, an anode, and a separator, and the separator is disposed between the cathode and the anode; and a middle portion of the cathode is provided with a cathode tab, and a middle portion of the anode is provided with an anode tab.

According to some embodiments of the present application, the curved electrode assembly is a wound structure, and the curved electrode assembly includes a plurality of cathode tabs and a plurality of anode tabs.

According to some embodiments of the present application, one of the plurality of side walls has a first electrode terminal and a second electrode terminal; and the first electrode terminal is electrically connected to the cathode tab, and the second electrode terminal is electrically connected to the anode tab.

BRIEF DESCRIPTION OF THE DRAWINGS

The following will briefly illustrate the accompanying drawings. Drawings necessary to describe the embodiments of the present application or the prior art will be briefly illustrated so as to facilitate the description of the embodiments of the present application. Obviously, the accompanying drawings described below only show some embodiments of the present application. For those skilled in the art, the drawings of other embodiments can still be obtained according to the structures illustrated in the drawings without any creative effort.

3

Figure 5:
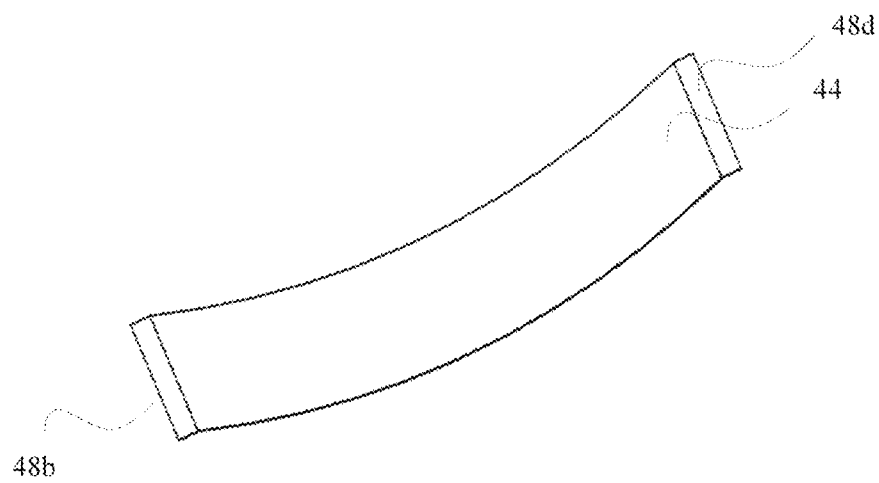
Figure 6:
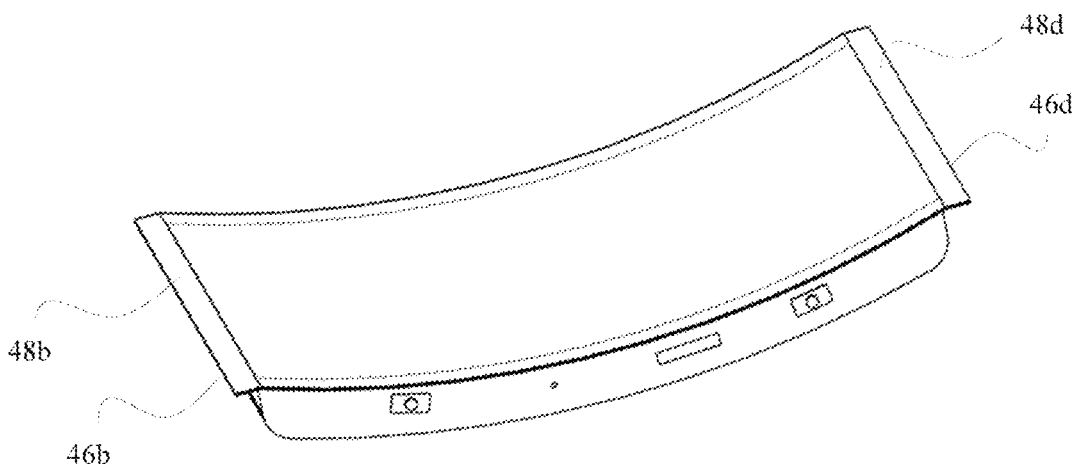
Figures 7, 8:
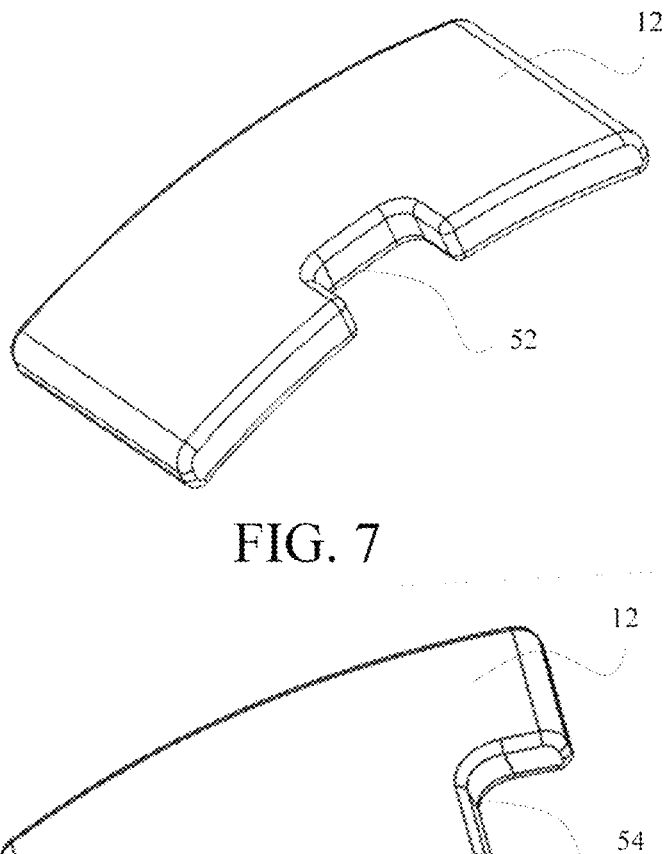
Figure 9:
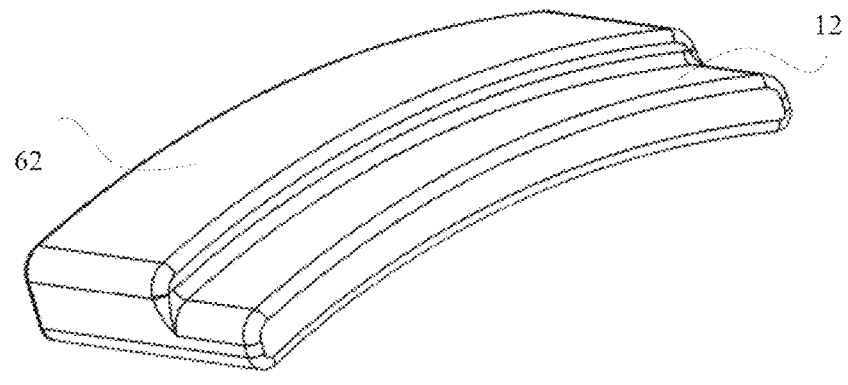
Figure 10:
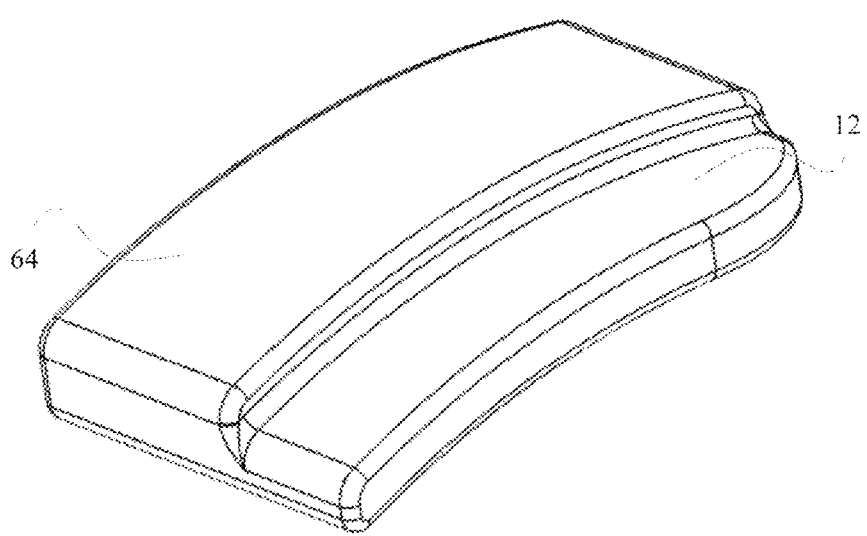
Figure 11:
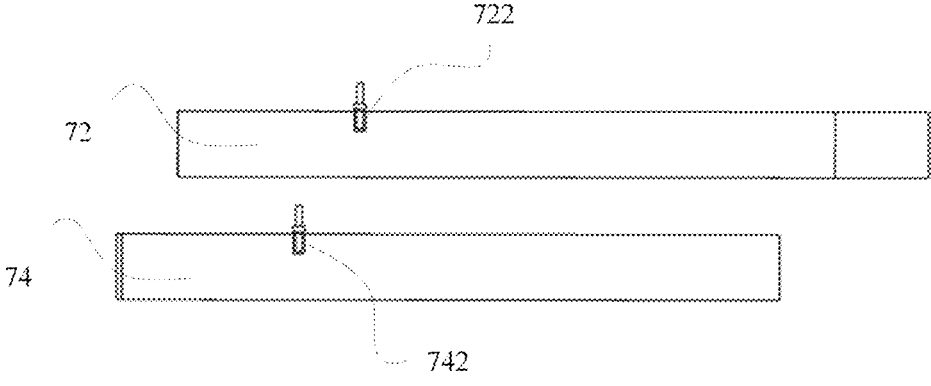
Figure 12:
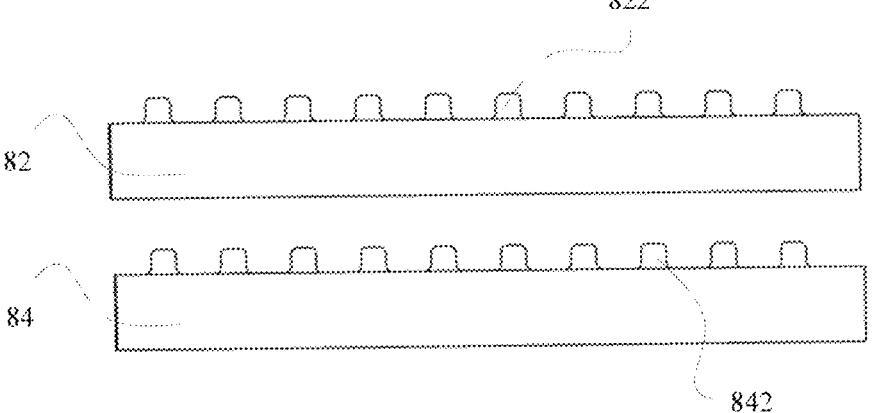

FIG. 5 is a schematic structural view of a curved metal plate according to another embodiment of the present application;

FIG. 6 is a schematic structural view of a battery according to another embodiment of the present application;

FIG. 7 is a schematic structural view of a curved electrode assembly according to another embodiment of the present application;

FIG. 8 is a schematic structural view of a curved electrode assembly according to another embodiment of the present application;

FIG. 9 is a schematic structural view of a curved electrode assembly according to another embodiment of the present application;

FIG. 10 is a schematic structural view of a curved electrode assembly according to another embodiment of the present application;

FIG. 11 is a schematic view of a tab of a wound curved electrode assembly in a middle position of an electrode according to another embodiment of the present application; and FIG. 12 is a schematic structural view of a plurality of tabs of a wound curved electrode assembly according to another embodiment of the present application.

DETAILED DESCRIPTION

The embodiments of the present application will be described in detail below. Throughout the specification, the same or similar components and components having the same or similar functions are denoted by similar reference numerals. The embodiments described herein with respect to the drawings are illustrative and graphical, and are used for providing a basic understanding of the present application. The embodiments of the present application should not be interpreted as limitations to the present application.

In the present application, unless otherwise particularly indicated or limited, relativistic wordings such as "in an arc length direction", "central", "longitudinal", "lateral", "front", "back", "right", "left", "inner", "outer", "relatively low", "relatively high", "horizontal", "vertical", "higher than", "lower than", "above", "below", "top", "bottom", and their derived wordings (such as "horizontally", "downward", and "upward") should be construed as referenced directions described in discussion or shown in the appended drawings. These relativistic wordings are merely used for ease of description, and do not require constructing or operating the present application in a specific direction.

In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or subranges within the ranges, like explicitly specifying each value and each sub-range.

As used herein, the term "about" is used to describe and explain minor changes. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or subranges within the ranges, like explicitly specifying each value and each sub-range.

Figure 1:
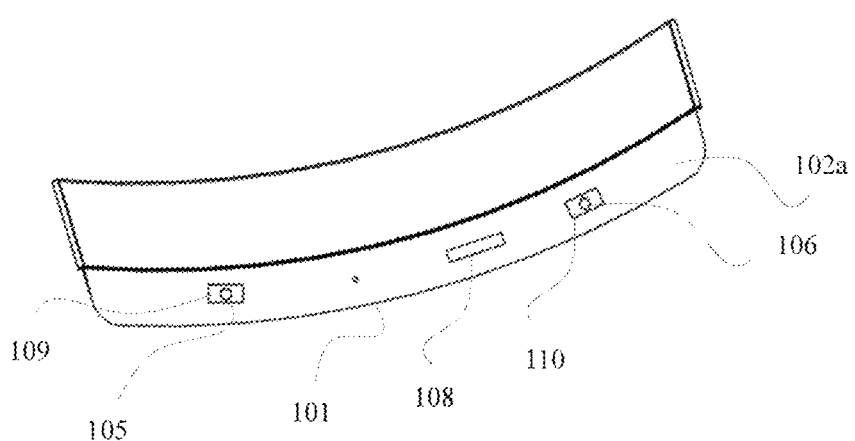
FIG. 1 is a schematic structural view of a battery according to an embodiment of the present application.
Figure 2:
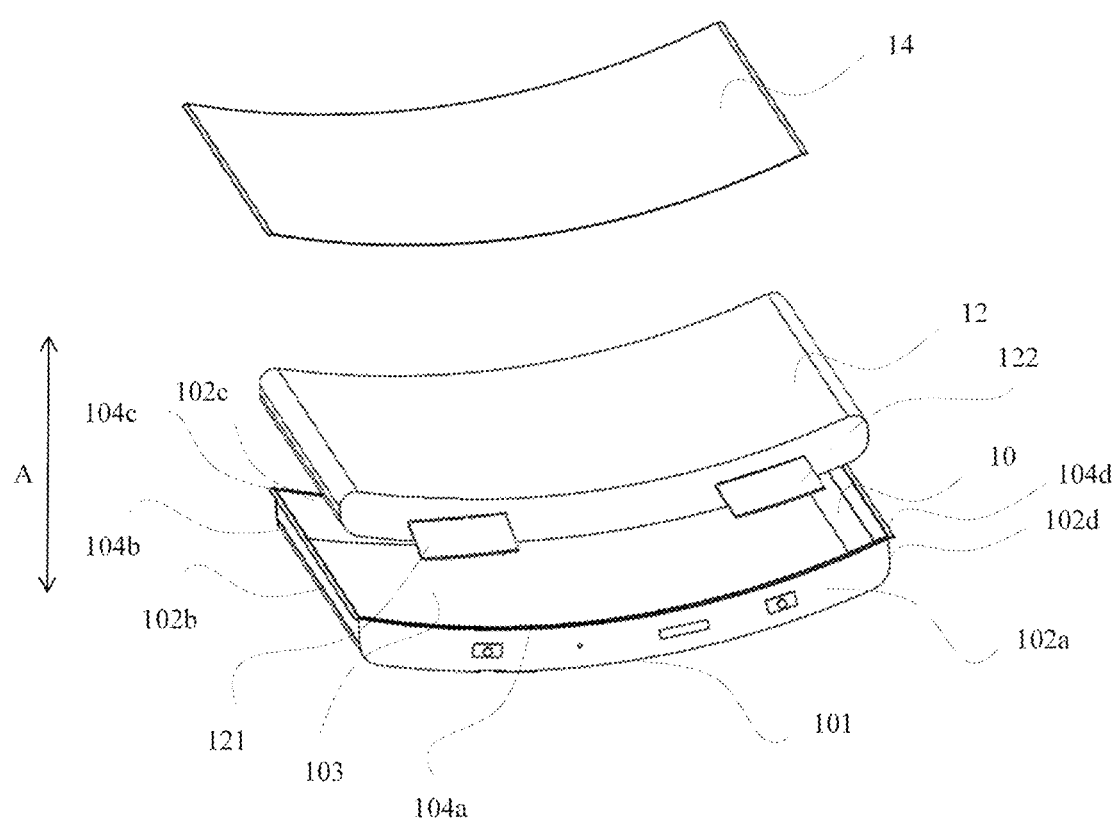
FIG. 2 is a schematic exploded structural view of the battery shown in FIG. 1.

FIG. 1 is a schematic structural view of a battery according to some embodiments of the present application. FIG. 2 is a schematic exploded structural view of the battery shown in FIG. 1.

As shown in FIG. 1 and FIG. 2, the battery includes a curved metal shell 10, a curved metal plate 14, and a curved electrode assembly 12 located between the curved metal shell 10 and the curved metal plate 14. The curved metal shell 10 has a curved surface 101 and a plurality of side walls 102*a*, 102*b*, 102*c*, and 102*d* extending from the curved surface 101. The curved surface 101 of the curved metal shell 10 and the plurality of side walls 102*a*, 102*b*, 102*c*, and 102*d* extending from the curved surface 101 together form an opening 103 along a thickness direction of the curved metal shell 10. The thickness direction is shown in FIG. 2 as a double-arrow direction indicated by the letter A. The curved electrode assembly 12 and tabs 121 and 122 located at a front end of the curved electrode assembly 12 are all disposed in the opening 103. The tabs 121 and 122 may be a cathode tab and an anode tab respectively. However, the configuration of the cathode tab and the anode tab can be determined according to actual needs, and is not limited thereto. For example, the tab 121 may be an anode tab, and the tab 122 may be a cathode tab. In order to prevent the curved electrode assembly 12 located in the opening 103 from colliding with the curved metal shell 10 when a drop or impact occurs, causing damage to the curved electrode assembly 12. In some embodiments of the present application, the curved electrode assembly 12 is fixedly disposed in the opening 103 of the curved metal shell 10 by a bonding manner. The bonding may be achieved by using glue, a double-sided tape or the like, but is not limited thereto. The curved metal plate 14 is also covered above the curved electrode assembly 12. The curved metal plate 14 is bound with the plurality of side walls 102*a*, 102*b*, 102*c*, and 102*d* of the curved metal shell 10 to seal the curved electrode assembly 12 between the curved metal shell 10 and the curved metal plate 14. Specifically, the curved metal plate 14 may be bound with the plurality of side walls 102*a*, 102*b*, 102*c*, and 102*d* by a welding (for example, laser welding), but the manner of bounding is not limited thereto. The tabs 121 and 122 and the curved electrode assembly 1 may also be bound by a welding (for example, laser welding), but the bounding manner is not limited thereto.

It should be understood that although the curved metal shell 10 having four side walls 102*a*, 102*b*, 102*c*, and 102*d* is shown in FIG. 1 and FIG. 2, as long as the side walls can form the opening 103 with the curved surface 101 of the curved metal shell 10, those skilled in the art can dispose any number of side walls according to actual needs without being limited thereto. Correspondingly, the structure of the curved metal plate 14 may also be changed as the structure of the curved metal shell 10 changes, so that the curved electrode assembly 12 is sealed between the curved metal shell 10 and the curved metal plate 14.

In addition, the plurality of side walls 102*a*, 102*b*, 102*c*, and 102*d* respectively correspond to four sides in a direction of the opening 103 of the curved metal shell 10, that is, a first side 104*a*, a second side 104*b* adjacent to the first side 104*a*, a third side 104*c* opposite to the first side 104*a*, and a fourth side 104*d* opposite to the second side 104*b*. As shown in FIG. 2, the second side 104*b* and the fourth side 104*d* are both horizontal sides, and the first side 104*a* and the third side 104*c* are both curved sides. However, in other embodiments of the present application, the first side 104*a*, the second side 104*b*, the third side 104*c*, and the fourth side 104*d* may also be all horizontal sides.

A material of the curved metal shell 10 and the curved metal plate 14 may be steel, aluminum, or other metals or alloys. The curved metal shell 10 and the curved electrode assembly 12 each have a certain curvature. Preferably, a curvature radius of curved surfaces of the curved metal shell 10 and the curved electrode assembly 12 may be any curvature radius greater than 8 mm.

In addition, the curved metal shell 10 further includes terminals 105 and 106 and an explosion-proof valve 108. The terminals 105 and 106 are located on the side wall 102*a*, and are respectively electrically connected to the tabs 121 and 122 disposed in the opening 103 by a welding (for example, laser welding), but the electrical connection manner is not limited thereto. Corresponding to the cathode tab 121 and the anode tab 122, the terminals 105 and 106 may be a cathode terminal and an anode terminal respectively. However, the specific configuration of the cathode terminal and the anode terminal may be determined according to the configuration of the tabs 121 and 122, and is not limited thereto. The terminals 105 and 106 are connected to a cathode and an anode of an external circuit respectively, to electrically connect the curved electrode assembly 12 to the external circuit through the tabs 121 and 122 respectively electrically connected to the terminals 105 and 106. The explosion-proof valve 108 is used to release gas generated in the opening 103 of the curved metal shell 10. As shown in FIG. 1 and FIG. 2, peripheries of the terminals 105 and 106 are further provided with insulating and sealing components 109 and 110 respectively. The insulating and sealing components 109 and 110 function to electrically insulate the terminals 105 and 106 from the side wall 102*a* of the curved metal shell 10 respectively and prevent an external liquid from entering the opening 103 of the curved metal shell 10 through a gap between the side wall 102*a* and the terminal 105 or 106. The insulating and sealing components 109 and 110 may be any insulating material, such as plastic and rubber.

Figures 3, 4:
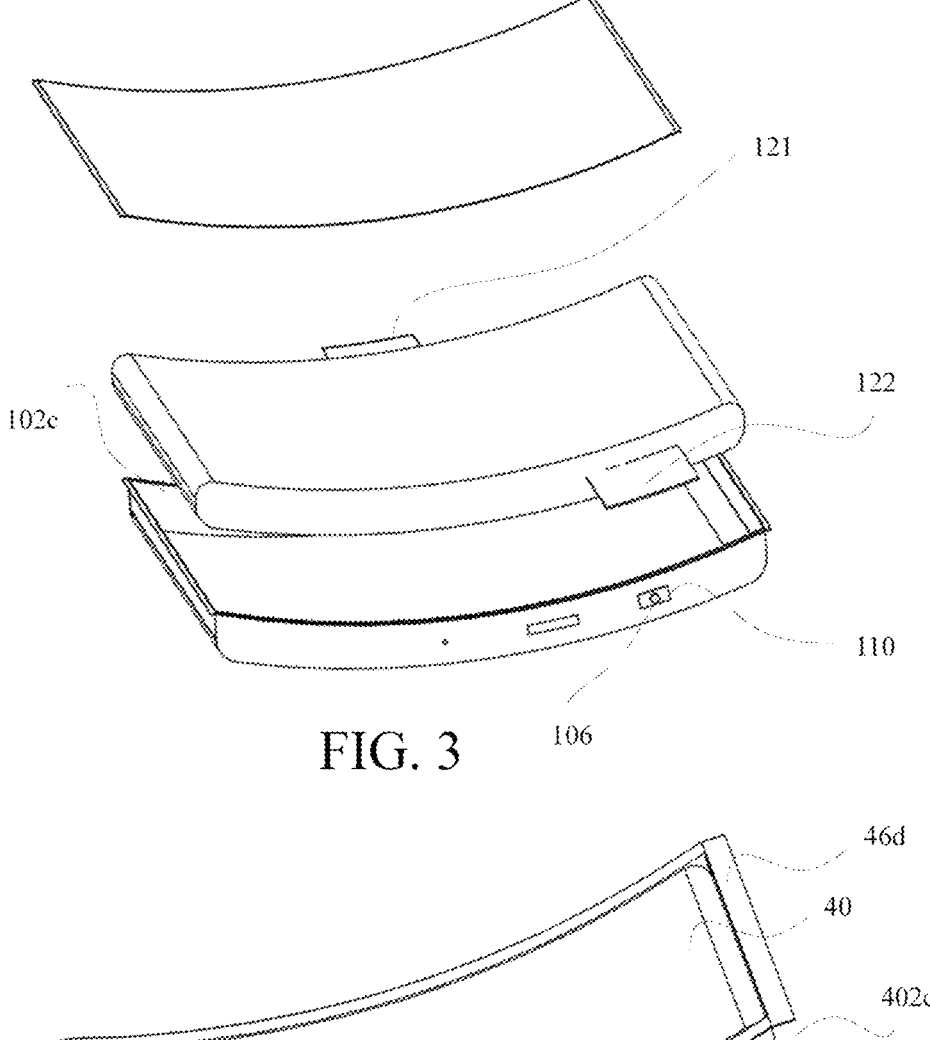
FIG. 3 is a schematic exploded structural view of a battery according to another embodiment of the present application.
FIG. 4 is a schematic structural view of a curved metal shell according to another embodiment of the present application.

FIG. 3 is a schematic exploded structural view of a battery according to other embodiments of the present application. The battery shown in FIG. 3 is substantially the same as the battery shown in FIG. 1 to FIG. 2 except positions of the tabs 121 and 122. As shown in FIG. 3, the tab 122 is still at the front end of the curved electrode assembly 12, and the tab 121 is at a rear end of the curved electrode assembly 12. Correspondingly, the terminal 106 is still disposed at the side wall 102*a* of the curved metal shell 10, and the terminal 105 is disposed at the side wall 102*c* of the curved metal shell 10.

In addition, according to other embodiments of the present application, the tabs 121 and 122 are simultaneously disposed at the rear end of the curved electrode assembly 12 (not shown), and meanwhile, positions of the terminals 105 and 106 are correspondingly modified according to the positions of the tabs 121 and 122 such that they are located at the side wall 102*d* of the curved metal shell 10.

FIG. 4 is a schematic structural view of a curved metal shell according to other embodiments of the present application. FIG. 5 is a schematic structural view of a curved metal plate according to other embodiments of the present application. FIG. 6 is a schematic structural view of a battery according to other embodiments of the present application.

The structures of the battery, the curved metal shell 40, and the curved metal plate 44 shown in FIG. 4 to FIG. 6 are substantially the same as those shown in FIG. 1 to FIG. 2, except that the battery, the curved metal shell 40, and the curved metal plate 44 shown in FIG. 4 to FIG. 6 are also provided with flanges 46*b* and 46*d* on side walls 402*b* and 402*d* of the curved metal shell 40 respectively, and corresponding positions of the curved metal plate 44 are also provided with flanges 48*b* and 48*d* respectively. The flanges 46*b* and 46*d* on the side walls 402*b* and 402*d* of the curved metal shell 40 are matched and bound with the flanges 48*b* and 48*d* on the curved metal plate 44 by a welding (for example, laser welding) manner respectively, thereby more effectively sealing the curved electrode assembly 12 between the curved metal shell 40 and the curved metal plate 44. It should be understood that although the curved metal shell 40 having two flanges 46*b* and 46*d* and the curved metal plate 44 having two corresponding flanges 48*b* and 48*d* are shown in FIG. 4 to FIG. 6, the flanges 46*b*, 46*d*, 48*b*, and 48*d* are not necessary, and the specific number of flanges can be set arbitrarily. For example, as shown in FIG. 1 to FIG. 2, no flanges are disposed, or the four side walls of the curved metal shell 40 and the four sides of the curved metal plate are correspondingly provided with flanges.

The battery structure shown in FIG. 1 can be obtained by trimming the flanges 46*b*, 46*d*, 48*b*, and 48*d* of the battery shown in FIG. 6. Preferably, in order to achieve the objective of sufficiently sealing the curved electrode assembly 12, the flanges of the battery shown in FIG. 6 are trimmed such that only flanges of about 0.5 mm-3 mm are retained.

FIG. 7 to FIG. 10 are schematic structural views of curved electrode assemblies according to other embodiments of the present application.

FIG. 2 to FIG. 3 of the present application both show the curved electrode assembly 12 having a complete curved surface. However, according to some embodiments of the present application, the curved electrode assembly may also have other structural forms. For example, the curved electrode assembly may be a two-dimensional special-shaped curved electrode assembly having a groove structure or an irregular protruding structure in a direction of the curved surface in a partial region. As shown in FIG. 7, the curved electrode assembly 12 has a groove structure 52 in a middle position in the direction of the curved surface. As shown in FIG. 8, the curved electrode assembly 12 has a groove structure 54 in a corner position in the direction of the curved surface. In addition to the positions shown in FIG. 7 and FIG. 8, the groove structure may also be located in other positions of the curved electrode assembly 12, and is not limited thereto. In addition, the curved electrode assembly 12 may also be a three-dimensional special-shaped curved electrode assembly having a locally irregular protruding portion in a thickness direction. As shown in FIG. 9 to FIG. 10, partial regions of the curved electrode assembly 12 on the curved surface are superposed to form a stepped structure 62/64 having steps.

In some embodiments of the present application, the curved electrode assembly includes a cathode containing a cathode material, an anode containing an anode material, and a separator. The separator is disposed between the cathode and the anode. The cathode and the anode may be made of a metal material, for example, copper foil and aluminum foil, but are not limited thereto.

The curved electrode assembly in the present application can be manufactured by a conventional method known to those skilled in the art. For example, in some embodiments of the present application, the curved electrode assembly is formed by sequentially winding or stacking the cathode, the separator, and the anode.

FIG. 11 is a schematic view of a tab of a wound curved electrode assembly in a middle position of an electrode according to other embodiments of the present application. As shown in FIG. 11, a middle portion of a cathode 72 of the wound curved electrode assembly is provided with a cathode tab 722, and a middle portion of an anode 74 is provided with an anode tab 742. Such disposition of the tabs can effectively reduce the impedance of the curved electrode assembly, thereby enhancing the ability of quick charge and reducing the temperature rise.

FIG. 12 is a schematic structural view of a plurality of tabs of a wound curved electrode assembly according to other embodiments of the present application. As shown in FIG. 12, a cathode 82 and an anode 84 of the wound curved electrode assembly are provided with a plurality of tabs 822 and 842 respectively. Specifically, one tab 822 of the plurality of tabs 822 is retained for each turn of the cathode 82, and one tab 842 of the plurality of tabs 842 is retained for each turn of the anode 84. Similar to the function of the structure of the wound curved electrode assembly disclosed in FIG. 11, such disposition of tabs disclosed in FIG. 12 can also reduce the impedance of the curved electrode assembly, thereby enhancing the ability of quick charge and reducing the temperature rise.

By disposing the opening in the thickness direction of the curved metal shell according to the present application, the curved electrode assembly having a complete curved surface, and the two-dimensional special-shaped curved electrode assemblies and the three-dimensional curved electrode assemblies such as those shown in FIG. 7 to FIG. 10 can all be horizontally placed into the curved metal shell easily, so that the difficulty in the manufacturing process of the battery is greatly reduced, and the control of the placement position of the curved electrode assembly is more accurate. For the two-dimensional special-shaped curved electrode assemblies and the three-dimensional curved electrode assemblies such as those shown in FIG. 7 to FIG. 10, they may also be made to be better matched with the space structure of the battery, thereby increasing the space utilization ratio of the battery and increasing the energy density of the battery.

In addition, in the above curved electrode assembly, the cathode includes a cathode material capable of absorbing and releasing lithium (Li) (hereinafter, sometimes referred to as "a cathode material capable of absorbing/releasing lithium Li"). Examples of the cathode material capable of absorbing/releasing lithium (Li) include one or more of lithium cobalt oxide, lithium nickel cobalt manganese oxide, lithium nickel cobalt aluminum oxide, lithium manganate, lithium manganese iron phosphate, lithium vanadium phosphate, lithium oxo-vanadium phosphate, lithium iron phosphate, lithium titanate and lithium-rich manganese-based material.

In the above cathode material, the chemical formula of the lithium cobalt oxide may be $LixCoaM1bO2-c$, wherein M1 is at least one selected from nickel (Ni), manganese (Mn), magnesium (Mg), aluminum (Al), boron (B), titanium (Ti), vanadium (V), chromium (Cr), ferrum (Fe), cuprum (Cu), zinc (Zn), molybdenum (Mo), stannum (Sn), calcium (Ca), strontium (Sr), wolfram (W), yttrium (Y), lanthanum (La), zirconium (Zr) and silicon (Si), and the values of x, a, b and c are respectively in the following ranges: $0.8 \leq x \leq 1.2$, $0.8 \leq a \leq 1$, $0 \leq b \leq 0.2$ and $-0.1 \leq c \leq 0.2$;

In the above cathode material, the chemical formula of the lithium nickel cobalt manganese oxide or the lithium nickel cobalt aluminum oxide may be $LiyNidM2eO2-f$, wherein M2 is at least one selected from cobalt (Co), manganese (Mn), magnesium (Mg), aluminum (Al), boron (B), titanium (Ti), vanadium (V), chromium (Cr), ferrum (Fe), cuprum (Cu), zinc (Zn), molybdenum (Mo), stannum (Sn), calcium (Ca), strontium (Sr), wolfram (W), zirconium (Zr) and silicon (Si), the values of y, d, e and f are respectively in the following ranges: $0.8 \leq y \leq 1.2$, $0.3 \leq d \leq 0.98$, $0.02 \leq e \leq 0.7$ and $-0.1 \leq f \leq 0.2$;

In the above cathode material, the chemical formula of the lithium manganate is $LizMn2-gM3gO4-h$, wherein M3 is at least one selected from cobalt (Co), nickel (Ni), magnesium (Mg), aluminum (Al), boron (B), titanium (Ti), vanadium (V), chromium (Cr), ferrum (Fe), cuprum (Cu), zinc (Zn), molybdenum (Mo), stannum (Sn), calcium (Ca), strontium (Sr) and wolfram (W), and the values of z, g and h are respectively in the following ranges: $0.8 \leq z \leq 1.2$, $0 \leq g < 1.0$ and $-0.2 \leq h \leq 0.2$.

The anode includes an anode material capable of absorbing and releasing lithium (Li) (hereinafter, sometimes referred to as "an anode material capable of absorbing/releasing lithium Li"). Examples of the anode material capable of absorbing/releasing lithium (Li) include carbon materials, metal compounds, oxides, sulfides, nitrides of lithium such as LiN3, lithium metal, metals forming alloys together with lithium, and polymer materials.

Examples of the carbon material include lowly graphitized carbon, easily graphitizable carbon, artificial graphite, natural graphite, mesocarbon microbeads, soft carbon, hard carbon, pyrolytic carbon, coke, glassy carbon, organic polymer compound sintered bodies, carbon fibers and activated carbon. The coke may include pitch coke, needle coke and petroleum coke. The organic polymer compound sintered body refers to a material obtained by calcining a polymer material such as a phenol plastic or a furan resin at a suitable temperature to carbonize it, and some of these materials are classified into lowly graphitized carbon or easily graphitizable carbon. Examples of the polymer material include polyacetylene and polypyrrole.

In addition, the anode material capable of absorbing/releasing lithium (Li) include elemental lithium metal, metal elements and semimetal elements capable of forming alloys together with lithium (Li), alloys and compounds including such elements. For example, they are used together with carbon materials since the good cycle performance and high energy density can be obtained in this shell. In addition to the alloys including two or more metal elements, the alloys used herein also include alloys containing one or more metal elements and one or more semimetal elements. The alloy may be in the state of a solid solution, a eutectic crystal (eutectic mixture), an intermetallic compound, and a mixture thereof.

Examples of the metal elements and the semimetal elements include stannum (Sn), plumbum (Pb), aluminum (Al), indium (In), silicon (Si), zinc (Zn), stibium (Sb), bismuth (Bi), cadmium (Cd), magnesium (Mg), boron (B), gallium (Ga), germanium (Ge), arsenic (As), argentum (Ag), zirconium (Zr), yttrium (Y) and hafnium (Hf). Examples of the above alloys and compounds include a material having a chemical formula: $MasMbtLiu$ and a material having a chemical formula: $MapMcqMdr$. In these chemical formulae, Ma represents at least one of metal elements and semimetal elements capable of forming an alloy together with lithium; Mb represents at least one of metal elements and semimetal elements other than lithium and Ma; Mc represents at least one of non-metal elements; Md represents at least one of metal elements and semimetal elements other than Ma; and s, t, u, p, q and r meet s>0, t≥0, u≥0, p>0, q>0 and r≥0.

In addition, an inorganic compound not including lithium (Li), such as MnO2, V2O5, V6O13, NiS and MoS, may be used in the anode.

The separator in some embodiments of the present application includes, but is not limited to, at least one selected from polyethylene, polypropylene, polyethylene terephthalate, polyimide and aramid. For example, the polyethylene includes at least one component selected from high-density polyethylene, low-density polyethylene and ultra-high molecular weight polyethylene. In particular, the polyethylene and the polypropylene have a good function on preventing short circuits, and can improve the stability of the battery by a turn-off effect.

The surface of the separator may further include a porous layer, the porous layer is disposed on at least one surface of the separator, the porous layer includes inorganic particles and a binder, and the inorganic particles are selected from one or a combination of more of aluminum oxide (Al2O3), silicon oxide (SiO2), magnesium oxide (MgO), titanium oxide (TiO2), hafnium oxide (HfO2), stannic oxide (SnO2), cerium dioxide (CeO2), nickel oxide (NiO), zinc oxide (ZnO), calcium oxide (CaO), zirconium dioxide (ZrO2), yttrium oxide (Y2O3), silicon carbide (SiC), boehmite, aluminum hydroxide, magnesium hydroxide, calcium hydroxide and barium sulfate. The binder is selected from one or a combination of more of polyvinylidene fluoride, a vinylidene fluoride-hexafluoropropylene copolymer, polyamide, polyacrylonitrile, polyacrylate ester, polyacrylic acid, polyacrylate salt, carboxymethylcellulose sodium, polyvinylpyrrolidone, polyvinyl ether, polymethyl methacrylate, polytetrafluoroethylene and polyhexafluoropropylene.

The porous layer can improve the heat resistance, oxidation resistance and electrolyte wettability of the separator, and enhance the bonding property between the separator and the cathode or anode.

The above description summarizes the features of several embodiments, which enables those of ordinary skill in the art to understand various aspects of the present application. Those of ordinary skill in the art can readily use the present application as a basis for designing or modifying other compositions to achieve the same objectives and/or the same advantages as the embodiments herein. It is also to be understood by those of ordinary skill in the art that these equal examples do not depart from the spirit and scope of the present application, and it is possible to make various changes, substitutions and modifications to the present application without departing from the spirit and scope of the present application. Although the methods disclosed herein have been described with reference to the specific operations that are performed in a specific order, it should be understood that these operations can be combined, subdivided, or reordered to form an equivalent method without departing from the teachings of the present application. Therefore, the order and grouping of operations are not a limitation to the present application unless specifically indicated herein.

What is claimed is:

1. A battery, comprising:
a curved metal shell, having a curved surface and a plurality of side walls extending from the curved surface;
a curved metal plate; and a curved electrode assembly, disposed between the curved metal shell and the curved metal plate;

wherein the plurality of side walls are bound with the curved metal plate to seal the curved electrode assembly between the curved metal shell and the curved metal plate;

wherein a convex surface of the curved metal plate faces the curved electrode assembly and a concave inner surface of the curved metal shell faces the electrode assembly;

wherein the curved metal plate and the curved metal shell are formed of a same material and have a same curvature radius;

wherein the curved electrode assembly is a wound structure;

the curved electrode assembly comprises a cathode, an anode, and a separator; and the separator is disposed between the cathode and the anode;

the cathode is provided with at least one cathode tab, and the anode is provided with at least one anode tab;

a first electrode terminal is disposed on one of the plurality of side walls and is electrically connected to the at least one cathode tab; and a second electrode terminal is disposed on another of the plurality of side walls and is electrically connected to the at least one anode tab;

wherein the plurality of side walls comprise a first sidewall, a second sidewall adjacent to the first sidewall, a third sidewall opposite to the first sidewall, and a fourth sidewall opposite to the second sidewall;

wherein the first sidewall and the third sidewall are horizontal sides extending parallel along a width direction of the curved metal shell, the second sidewall and the fourth sidewall are curved sides extending parallel along a longitudinal direction of the curved metal shell;

wherein the first electrode terminal and the second electrode terminal are disposed on the second sidewall and the fourth sidewall, respectively.

2. The battery according to claim 1, the plurality of side walls comprise a first flange; the curved metal plate comprises a second flange; and the plurality of side walls are bound with the second flange through the first flange.

3. The battery according to claim 2, wherein the first flange is integrally formed with the plurality of side walls, and the second flange is integrally formed with the curved metal plate.

4. The battery according to claim 1, wherein the curved electrode assembly comprises a groove or is formed with steps.

5. The battery according to claim 1, wherein the curved electrode assembly and the curved metal shell have the same curvature radius, and the curvature radius is greater than 8 mm.

6. The battery according to claim 1, a middle portion of the cathode is provided with a single cathode tab, and a middle portion of the anode is provided with a single anode tab.

7. The battery according to claim 1, wherein the curved electrode assembly comprises a plurality of cathode tabs and a plurality of anode tabs.

8. The battery according to claim 1, wherein the plurality of side walls are bound with the curved metal plate by welding.

9. The battery according to claim 1, wherein the curved metal shell comprises an opening formed by the curved surface and the plurality of side walls extending from the curved surface.

10. The battery according to claim 9, wherein the curved electrode assembly is disposed in the opening of the curved metal shell.

11. The battery according to claim 10, wherein the curved electrode assembly is fixedly disposed in the opening of the curved metal shell by bonding.

12. The battery according to claim 9, wherein the curved metal shell further includes an insulating and sealing component provided at a periphery of the first electrode terminal and a periphery of the second electrode terminal.

13. The battery according to claim 12, wherein the insulating and sealing component is made up of plastic.

14. The battery according to claim 9, wherein the curved metal shell further includes an explosion-proof valve for releasing gas generated in the opening of the curved metal shell.

15. The battery according to claim 14, wherein the explosion-proof valve provided at a side wall of the curved metal shell.

16. The battery according to claim 1, wherein the material of the curved metal shell and the curved metal plate is selected from any one of steel, aluminum and alloys.

17. The battery according to claim 2, wherein each of a length of the first flange and a length of the second flange ranges from 0.5 mm-3 mm.

18. The battery according to claim 1, wherein the first electrode terminal and the second electrode terminal are disposed on opposite side walls.

\* \* \* \* \*